United States Patent [19]

Taylor

[11] Patent Number: 4,860,537

[45] Date of Patent: Aug. 29, 1989

[54] HIGH BYPASS RATIO COUNTERROTATING GEARLESS FRONT FAN ENGINE

[75] Inventor: John B. Taylor, Cincinnati, Ohio

[73] Assignee: Brandt, Inc., Bensalem, Pa.

[21] Appl. No.: 169,135

[22] Filed: Mar. 10, 1988

Related U.S. Application Data

[63] Continuation of Ser. No. 902,341, Aug. 29, 1986, abandoned.

[51] Int. Cl.⁴ .............................................. F02K 3/072
[52] U.S. Cl. ..................................... 60/226.1; 60/268; 60/39.162; 415/65
[58] Field of Search ............... 60/226.1, 39.162, 39.31, 60/262, 268; 416/128, 129; 415/65

[56] References Cited

U.S. PATENT DOCUMENTS

| | | |
|---|---|---|
| 2,360,130 | 10/1944 | Heppner . |
| 2,404,767 | 7/1946 | Heppner . |
| 2,430,399 | 11/1947 | Heppner . |
| 2,478,206 | 8/1949 | Redding . |
| 2,608,821 | 9/1952 | Hunsaker . |
| 2,702,985 | 3/1955 | Howell . |
| 2,812,898 | 11/1957 | Buell . |
| 3,153,907 | 10/1964 | Griffith . |
| 3,363,419 | 1/1968 | Wilde ........................... 60/39.162 |
| 3,363,831 | 1/1968 | Garnier ........................... 415/65 |
| 3,385,064 | 5/1968 | Wilde et al. ..................... 60/226.1 |
| 3,391,540 | 7/1968 | Bauger et al. . |
| 3,448,582 | 6/1969 | Bracey et al. ................... 60/226.1 |
| 3,462,953 | 8/1969 | Wilde et al. ..................... 60/226.1 |
| 3,524,318 | 8/1970 | Bauger et al. ..................... 60/268 |
| 3,526,092 | 9/1970 | Steel ............................. 60/39.31 |
| 3,620,009 | 11/1971 | Wilde .......................... 60/226.1 |
| 3,620,021 | 11/1971 | Lawrie . |
| 3,638,428 | 2/1972 | Shipley et al. ................. 60/226.1 |
| 3,673,802 | 7/1972 | Krebs et al. ................... 60/226.1 |
| 3,713,748 | 1/1973 | Langley ....................... 60/226.1 |
| 3,861,139 | 1/1975 | Jones .......................... 60/226.1 |
| 3,897,001 | 7/1975 | Heimintoller, Jr. et al. ... 239/265.13 |
| 4,159,624 | 7/1979 | Gruner . |
| 4,192,137 | 3/1980 | Chappell et al. ............... 60/39.161 |
| 4,327,548 | 5/1982 | Woodward ..................... 60/229 |
| 4,463,553 | 8/1984 | Boudignes ..................... 60/268 |

FOREIGN PATENT DOCUMENTS

| | | |
|---|---|---|
| 586560 | 3/1947 | United Kingdom . |
| 620721 | 3/1949 | United Kingdom . |
| 765915 | 1/1957 | United Kingdom . |
| 774502 | 5/1957 | United Kingdom . |
| 1069033 | 5/1967 | United Kingdom . |
| 1206469 | 9/1970 | United Kingdom . |
| 2099082 | 12/1982 | United Kingdom . |
| 2129502 | 5/1984 | United Kingdom ............ 60/39.162 |

OTHER PUBLICATIONS

Jet Propulsion Turbojets, by Volney C. Finch (Millbrae, California, The National Press, 9/1948, title page, page iii, and pages 296 to 304).

Primary Examiner—Donald E. Stout
Attorney, Agent, or Firm—Shenier & O'Connor

[57] ABSTRACT

A gas turbine engine having a core gas generator engine for generating combustion gases, with an additional power turbine, an additional fan section, and a booster compressor. The power turbine includes two counter rotatable turbine blade rows which are alternately interdigitized and serve to rotate counter rotating first and second drive shafts, respectively. The fan section also includes counter rotating spaced apart fan blade sections which are respectively connected to the first and second drive shafts. A booster compressor is axially positioned between the spaced apart fan sections. The booster compressor likewise includes first and second blade rows which are counter rotating alternately interdigitized and are likewise driven by the first and second drive shafts. The engine is supported from the two frames to permit the nacelle to be non-structural. The core engine is a modular unit so that it can be separable from the counter rotating turbine, fans and booster.

16 Claims, 3 Drawing Sheets

HIGH BYPASS RATIO COUNTERROTATING GEARLESS FRONT FAN ENGINE

This is a continuation, of application Ser. No. 902,341, filed Aug. 29, 1986 now abandoned.

This invention relates to gas turbine engines, and more particularly, to an improved turbo fan engine with counter rotating rotors driving counter rotating ducted front fans as well as a counter rotating booster compressor.

BACKGROUND OF THE INVENTION

Conventional turbo props are typically used at lower cruise speeds where they provide good performance and high efficiency. At higher cruise speeds, it is typically required to use a turbo fan to produce the relatively high thrust required. A scaled up version of a conventional turbo prop engine suitable for powering an intermediate-sized transport aircraft at the required cruise speeds and altitude would require excessivley large propeller diameters and would require the capability of generating higher shaft horsepower than is conventionally possible. While these high bypass ratio engines are efficient, the rotational speed of the large diameter propeller is a limiting factor in the use of such engines. It is generally required to keep the helical velocity of the propeller tip below supersonic speeds. Propeller tips operating at supersonic speeds generate a significant amount of undesirable noise and results in a loss of aerodynamic efficiency.

The turbo machinery for aircraft having such fans which have a bypass ratio greater than about eight are generally arranged to use a speed change gearbox in order to reduce the speed of the fan rotor relative to the speed of the turbine. The speed change gearbox provides the method for a more optimum fan blade speed for higher efficiency along with a high speed, smaller diameter turbine drive shaft and a high speed turbine with fewer stages. However, a gear box and associated accessories result in a significant increase in engine complexity and weight.

OBJECTS OF THE INVENTION

It is accordingly, an object of the present invention to provide an improved high bypass ratio, counter rotating, gearless front fan engine.

It is another object of the present invention to provide a gas turbine engine using counter rotating turbine sections which drive counter rotating front fans and a counter rotating booster section.

It is a further object of the present invention to provide a gas turbine engine having a core gas generator with two interdigitated counter rotating turbine sections aft of the core engine, two counter rotating fan blade sections forward of the core engine, and two counter rotating interdigitated booster compressor sections spaced between the fan blade sections.

Another object of the present invention is to provide a gas turbine engine having two stationary frames with a gas generator core engine supported therebetween and with the same stationary frames supporting a counter rotating turbine section aft of the core engine and a counter rotating fan blade section forward of the core engine with a counter rotating booster compressor section between the fan blade sections.

A further object of the present invention is to provide a gas turbine engine having all of the engine parts supported by the outer casing of the core engine and a pair of spaced apart fixed supports and with the engine parts contained within a non-structural supporting outer shroud.

Yet a further object of the present invention is to provide a gas turbine engine having a forward mounted, counter rotating fan with an annular duct and a counter rotating booster compressor spaced between fan sections.

SUMMARY OF THE INVENTION

The present invention provides turbo machinery for a very high bypass ratio, front fan engine which does not use a gear between the fan and the turbine and also does not use a large number of booster and turbine stages. The engine consists of counter rotating fan sections connected to a counter rotating turbine. The connecting counter rotating shafts between the fan and the turbine pass through the center bore of a core engine. A counter rotating booster compressor is also operated by the same shafts. By utilizing a counter rotating booster and counter rotating turbine arrangement, the number of booster and turbine stages can be generally reduced by a factor of two for a given level of efficiency and rotator speed.

In an embodiment of the invention, the counter rotating booster is positioned axially between the counter rotating front and aft fan sections. The engine is supported by two axially spaced apart stationery support frames. A center core engine including a compressor, combustor and a high pressure turbine is supported from the two frame support. The counter rotating turbine is supported by the rear support frame aft of the core engine. The front support frame also supports the counter rotating fan section and counter rotating booster sections. Support struts extending from the front support also support a duct annularly positioned about the fan sections. A nacelle is provided about the engine with the nacelle providing no structural support for any of the engine parts.

DETAILED DESCRIPTION OF THE INVENTION

Figure 1:
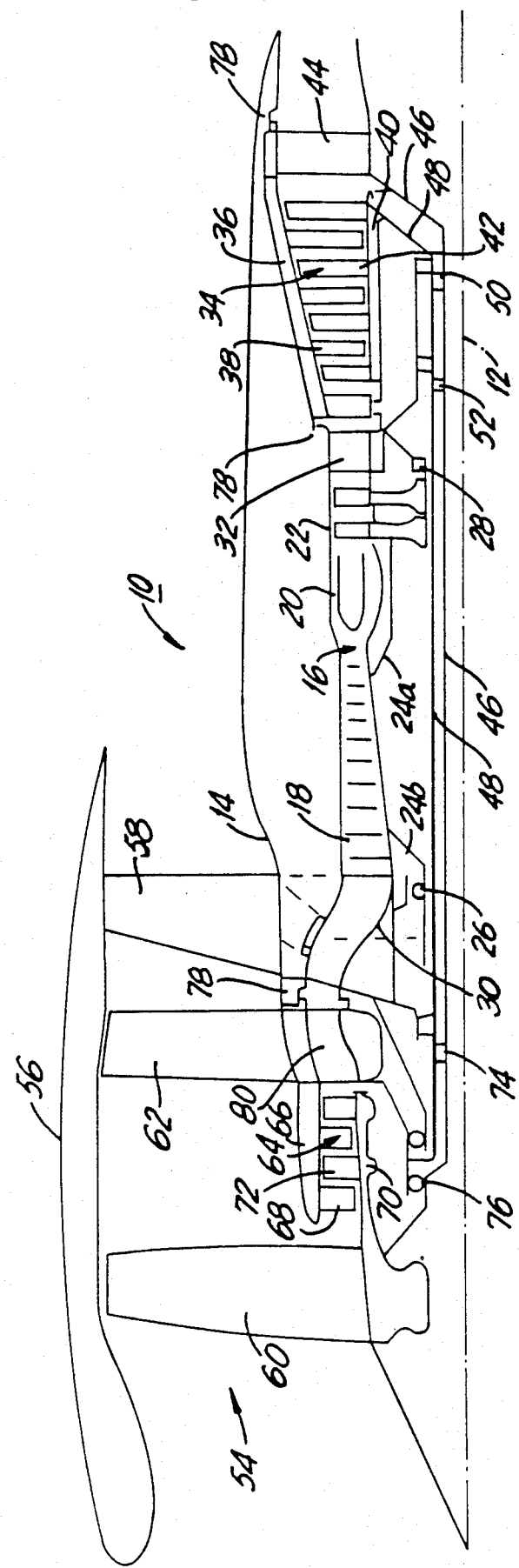
FIG. 1 is a schematic cross section for a high bypass ratio, counter rotating, gearless front fan engine in accordance with an embodiment of the present invention.

FIG. 1 shows a gas turbine engine 10 according to one embodiment of the present invention. Engine 10 includes a longitudinal center line axis 12 and an annular shroud 14 disposed co-axially about axis 12. As will hereinafter be explained in greater detail, shroud 12 is nonstructural in that it does not support any of the engine components. It can therefore be constructed of thin sheet metal such as aluminum and/or composite material.

Engine 10 also includes a core gas generator referred to as core engine 16. Such core generator includes a compressor 18, a combustor 20 and a high pressure turbine 22, either singular or multiple stage. The core engine is modular in that it is a single unit and can be independently replaced separate from the other parts of the gas turbine. All of the parts of the core engine 16 are arranged co-axially about the longitudinal axis 12 of engine 10 in serial axial flow relationship. An annular drive shaft 24A and 24B fixedly interconnect compressor 18 and high pressure turbine 22.

The core engine is supported between the main support frame including the stationery support 30 and the aft support member 32. These frames supports 30 and 32 also support the other parts of the engine. The engine components do not depend from the outer shroud 14 thereby permitting the shroud 14 to be a non-structural element. The gas generator core engine 16 is effective for generating combustion gases. Pressurized air from compressor 18 is mixed with fuel in combustor 20 and ignited, thereby generating combustion gases. Some work is extracted from these gases by high pressure turbine 22 which drives compressor 18. The remainder of the combustion gases are discharged from the gas generator core engine 16 into the power turbine shown generally at 34.

Power turbine 34 includes a first outer annular drum rotor 36 rotatably mounted to the aft support frame 32. The rotor 36 includes a plurality of first turbine blade rows 38 extending radially inward therefrom and axially spaced from each other.

Power turbine 34 also includes a second, inner annular drum rotor 40 disposed radially inwardly of first outer rotor 36 and the first blade rows 38. The second rotor 40 includes a plurality of second turbine blade rows 42 extending radially outwardly therefrom and axially spaced.

A rotating frame support 44 provides the support for the outer turbine rotor case 36 and blades 38. This support in turn is carried by the aft stationary support member 32. Extending from the support 44 is an inner shaft 46. An outer co-axial shaft 48 is connected to the second, inner rotor, 40. Differential bearing sets 50 and 52 are coupled between the rotating shafts 46 and 48.

The core engine 16 with its high speed rotation forms a separate modular unit with its own high speed bearings. Therefore, the differential bearings supporting the shafts 46, 48 can be low speed bearings. The differential bearing arrangement can include one bearing supported by the other.

Each of the first and second turbine blade rows 38, 42 comprises a plurality of circumferentially spaced turbine blades, with the first blade rows 38 alternately spaced with respect to ones of the second blade rows 42. The blades of the two rotors being interdigitated and alternating with each other. Combustion gases flowing through the blade rows 38 and 42 drive the first and second rotors 36, 40 in counter rotating directions. Thus, the shafts 46 and 48 will also be rotating in counter rotating directions. The shaft 46, 48 are co-axially disposed relative to the center line 12 of the engine 10 and extend forward through the core section 16.

At the forward part of the engine there is provided a front fan section 54. An outer fan duct or cowl 56 annularly surrounds the fan section 54. The cowl 56 is supported by means of the struts 58 extending from the main support frame 30.

Fan section 54 includes a first fan blade row 60 connected to a forward end of the inner counter rotating shaft 46 which extends between the turbine and the fan sections. Fan section 54 includes a second fan blade row 62 connected to the forward end of the inner drive shaft 48 also connected between the turbine and the fan sections. Each of the first and second fan blade rows 60 and 62 comprises a plurality of circumferentially spaced fan blades. Fan blade rows 60 and 62 are counter rotating which provides a relatively high fan efficiency and propulsive efficiency with generally low absolute tip speed on each fan blade row. The fan blade rows 60 and 62 extend radially outwardly to the fan duct 56 and substantially cross the entire air flow passage between the engine shroud and the cowl 56. Fan blade leading and/or trail edges may be of either swept or non-swept design.

It should be appreciated that the counter rotating fan blade row 62 serves to remove the swirl or circumferential component of air imparted by the counter rotating fan blade row 60. In this way, the struts 58 are not outlet guide vanes in the sense that no swirl need be taken out by the struts. Therefore, only a relatively small number of struts 58 are required to support the cowl 56. Typically, only six or eight Fan frame struts are required as compared to approximately 40 struts where such struts must also remove the swirl from the air.

The struts 58 are positioned axially forward of the core engine 16. This allows support of the engine at a location as close to fan blade rows 60 and 62 as possible.

Engine 10 further comprises a booster compressor 64. Booster compressor 64 includes a first annular rotor 66 which also serves as the intake end of the main flow path through the engine. A plurality of first compressor blade rows 68 extend radially inwardly from the rotor 66 and are axially spaced from each other. Booster compressor 64 also includes a second annular rotor 70 disposed inwardly of rotor 66 and includes a plurality of second compressor blade rows 72 extending radially outwardly therefrom and axially spaced. The first and second compressor blade rows 68, 72 are interdigitated and are counter rotating. The rotor 66 is fixedly attached to fan blade row 62 as well as a forward end of the outer shaft 48. Similarly, rotor 70 is fixedly attached to fan blade row 60 and the forward end of the inner shaft 46.

Each of the first and second compressor blade rows 68, 72 comprise a plurality of circumferentially spaced compressor blades, with the blade rows alternating with each other. Compressor blade rows 68 and 72 are counter rotating and located in the flow passage leading to the main core engine 16.

The counter rotating booster compressor 64 provides a significant pressure rise to air entering the core engine 16. An advantage of having the fan blade row and the compressor blade rows driven by the same drive shaft is that energy is optimally extracted from the power turbine 34. Without the booster compressor stages being driven by the power turbine from shafts 46 and 48, a separate compressor with an additional shaft and drive turbine would be required. Furthermore, if the booster compressor stages were non-existent, the engine would be limited in overall pressure ratio resulting in poorer efficiency. The rotating booster gives sufficient pressure rise despite the slow fan speed. By having compressor blade rows 68 and 72 counter rotating, a lessor number of compressor blade rows than that required for a single low speed compressor driven from only one shaft is possible.

At the front end of the shaft 46 and 48 there are likewise provided two sets of bearings 74 and 76, of which bearing set 76 is a differential. These likewise do not support the high speed bearing about which the core engine rotates. A rotating frame 80 is provided to support the rear fan blades 62 as well as the outer booster case and blades. The rotating frame 80 is in turn supported by the stationary frame. A series of seals 78 are appropriately provided for retaining the flow within the engine passageways.

An important feature of the present invention is the positioning of the booster compressor 64. In order to reduce the noise resulting from the fan blade sections 60 and 62, sufficient spacing must be provided between the blade sections. The spacing should preferably be one and one half times or more than the aero chord length of the first blade 60. There should also be a spacing between the aft blade section 62 and the struts 58. Preferably such spacing should be about one chord length.

Accordingly, the axial spacing between the fan blade sections 60 and 62 is used for positioning of the counter rotating booster blades 68 and 72. The booster is therefrom contained within the length of the fan sections and is positioned in parallel with the air flow.

Figure 2A:
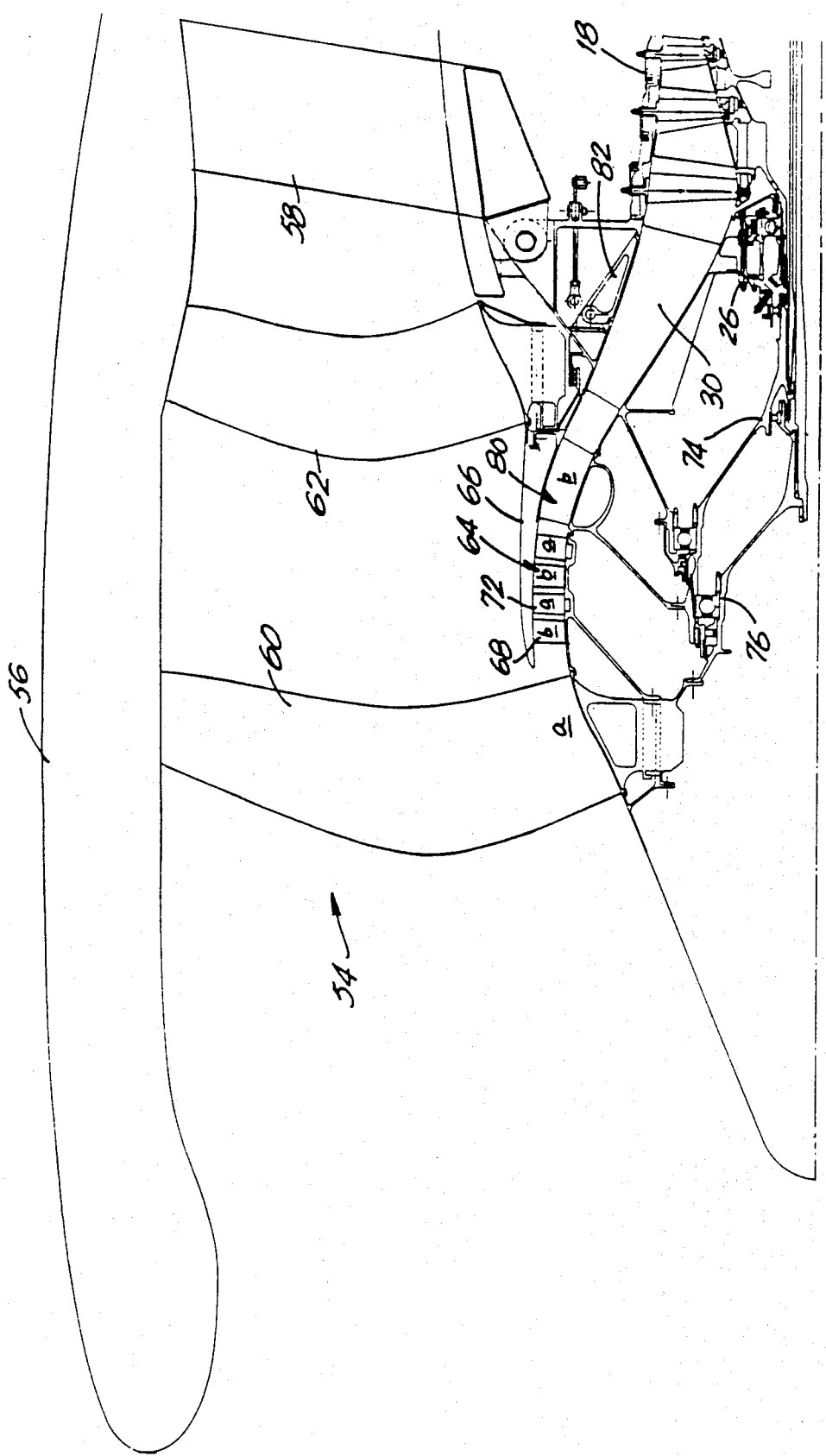
FIGS. 2A and 2B compositely represent a more detailed view of the gas turbine engine shown in FIG. 1.
Figure 2B:
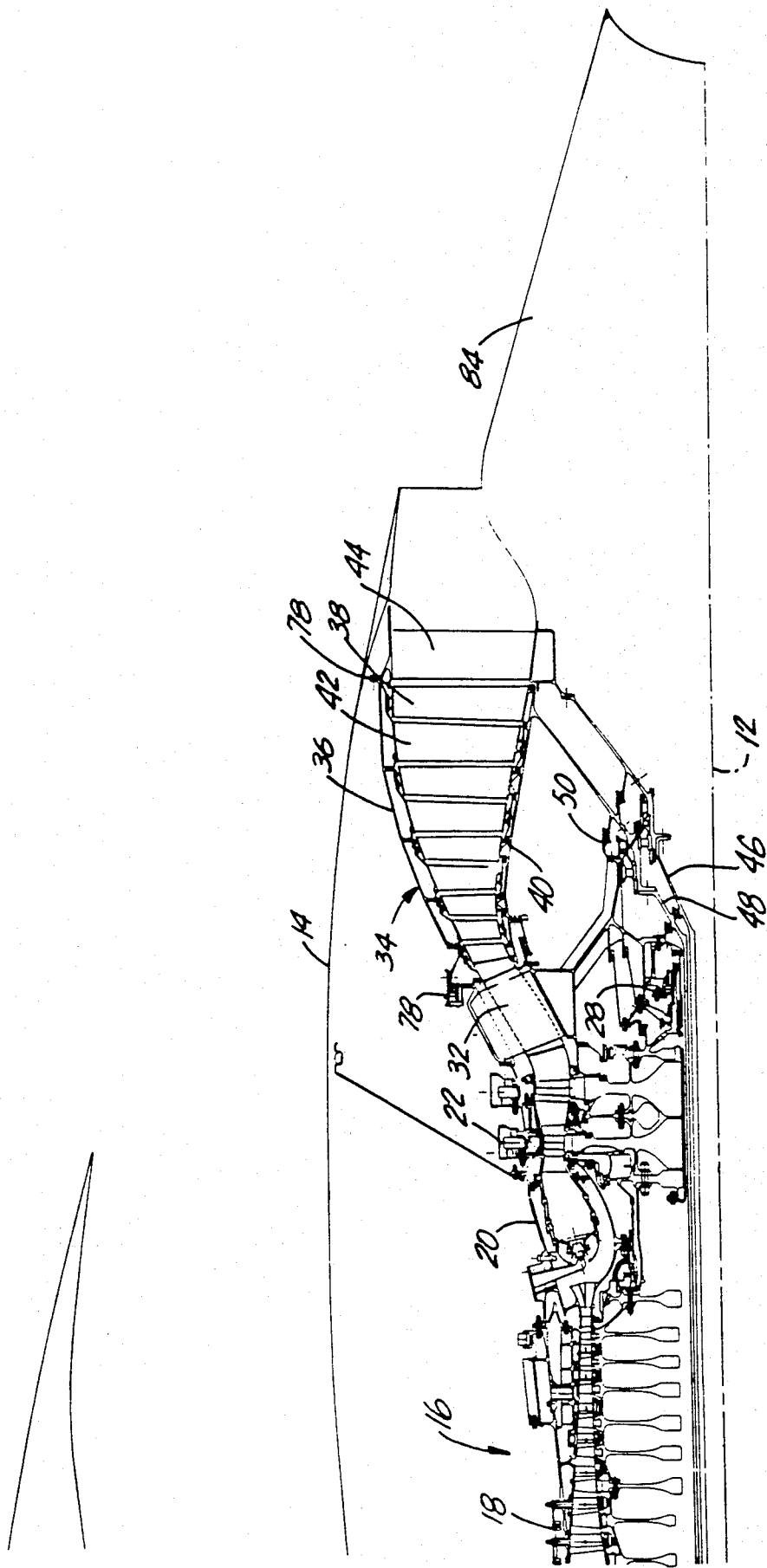

FIGS. 2A and 2B compositely show a more detailed view of the gas turbine engine shown in FIG. 1. Like parts in FIGS. 2A and 2B are identified in a like manner as in FIG. 1. However, some additional features are shown in FIGS. 2A and 2B and these will be hereinafter described.

Along the flow path through the engine, and positioned aft of the booster compressor 64 is a rotating vane frame 80. The vane frame is connected to the outer rotor 66 and rotates along with the booster compressor blades 68. In this manner, by including the front fan blades 60, the booster compressor can be considered as a six stage booster with the booster sections of one blade row being identified with the letter a and the booster sections of the other blade row being identified with the letter b. The aft fan blade row 62 is positioned in the by pass flow but not in the main core air flow.

Bleed doors 82 are provided in order to adjust the pressure along the flow path. The pressure ratio to the booster section 64 is higher than the fan pressure ratio and the bleed doors serve to control the stall margin on the boosters. Thus, there can be achieved a higher overall pressure ratio. When the bleed doors are opened, the air dumps out behind the fan. The pumping characteristics of the low pressure booster and the pumping characteristics of the core are not the same. They are matched up at high speed where the engine is normally run. However, at low speed, it is necessary to relieve the pressure so that there is not provided any back pressure whereby it would stall. The doors open up to relieve the pressure at low speed and at idle speed so that it will not stall the boosters.

The stationery frame members 30 at the front end and 32 at the rear end include fixed arms extending therefrom and supporting the core engine 16. Likewise, the power turbine 34 is supported from the stationery frame 32 at the rear end, and the fan and booster sections 54 and 64 are supported by the front stationery frame 30. The core rotates along a two bearing set including the front bearing 26 and the rear bearing 28.

The engine components are all supported by the two main stationery supports 30 and 32 and the outer casing of the core engine 16. The outer shroud or nacelle 14 is therefor non-structuraly supporting. The end exhaust system 84 continues to rotate along with the shaft 46. In this way, it need not be supported by the outer nacelle. However, if desired, the end nozzle could be separated and a structural support could be extended between the outer shroud 14 and the end exhaust system. In this case, however, it would be necessary to provide the casing 14 with structural rigidity.

The core engine itself can typically be the GE/NASA E$^3$ core engine whose specifications are available. However, since the core engine is an integral unit by itself, it is possible to replace this engine with other engines such as the CF6 core or the CFM 56 core, or others.

In order to achieve thrust reversal, a standard thrust reversal unit can be included in the system. Alternately, a variable pitch mechanism can be provided, as is known in the art, and incorporated within the system.

Typically, the fans will rotate at substantially the same speeds and can be adjusted through known techniques to modify the speeds to desired values.

The aforementioned engine utilizes counter rotating front fans driven by a counter rotating tubine. The fan rotors contain booster compressor stages which are used to super charge the core engine. The number of booster compressor stages depend upon the degree of super charging desired. The number and size of the counter rotating turbine stages depend upon the energy requirement and the desired level of efficiency. The core engine consists of a compressor, combustor, and turbine with an adequate sized center bore to accommodate the counter rotating turbine shafts. The core engine can be designed to have varying requirements and disk bore stress levels which are within available means.

It is noted, that the engine is gearless and yet a very high bypass ratio front fan engine is achieved which can provide a reduction in specific fuel consumption without the complexity of the gearbox and associated accessories. Using such high bypass ratio, counter rotating, gearless front fan engine with an outer duct, high bypass ratios of 10-20 can be achieved and horsepowers of 75,000 or more HP are contemplated.

Numerous modifications, variations, and full and partial equivalents can be undertaken without departing from the invention as limited only by the spirit and scope of the appended claims.

What is desired to be secured by Letters Patent of the United States is the following:

What is claimed is:

1. A gas turbine engine comprising:
   a unitary core gas generator effective for generating combustion gases;
   a counterrotating power turbine completely aft of said gas generator including first and second counter rotatable interdigitated turbine blade rows effective for rotating first and second drive shafts, respectively;
   a counterrotating fan section completely forward of said gas generator including a first fan blade row connected to said first drive shaft and a second fan blade row axially spaced from said first fan blade row and connected to said second drive shaft, and
   a counterrotating booster compressor axially positioned completely forward of said gas generator and between said first and second fan blade rows and including a first compressor blade row connected to said first drive shaft and a second compressor blade row interdigitated with said first compressor blade row and connected to said second drive shaft whereby each turbine row of the first and second turbine blade rows respectively drives both a fan blade row and a compressor blade row.

2. A gas turbine engine as recited in claim 1, wherein said first and second fan blade rows are axially spaced approximately one to two times the aero chord length of the first blade outer section.

3. A gas turbine engine as recited in claim 1, and further comprising an annular fan duct surrounding said first and second blade rows, and a plurality of radially extending struts supporting said fan duct, said struts being axially spaced aft of the rearward blade row by approximately a chord length of the second fan blade.

4. A gas turbine engine as recited in claim 3, and comprising approximately 6-8 fan frame struts.

5. A gas turbine engine as recited in claim 1 and further comprising a rotating vane frame positioned along the main flow path between said booster compressor and said core engine, and counter rotating with respect to the aft most compressor blade.

6. A gas turbine engine as recited in claim 1, and further comprising bleed doors positioned between said booster compressor and said core engine for relieving the pressure differential to control the stall margin on the booster compressor.

7. A gas turbine engine as recited in claim 1, and comprising a main flow path and a bypass flow path, said first fan blade row being axially forward of said second fan blade row and extending across both said flow paths, said second fan blade row extending across said bypass flow path, said counterrotating booster compressor extending across said main flow path, said counterrotating booster compressor comprising an outer rotor inwardly supporting said first compressor blade row, and an inner rotor outwardly supporting said first compressor blade row, said outer rotor serving as an intake end of the main flow path.

8. A gas turbine engine, comprising:
a pair of spaced apart annular stationery frame supports;
a core gas generator engine comprising an outer casing and including a core compressor, combustor, and turbine in serial flow relationship effective for generating combustion gases, said core engine with its outer casing supported by said frame supports;
a power turbine aft of said core engine, including first and second counter rotatable turbine blade rows effective for rotating first and second drive shafts, respectively, said power turbine supported by one of said frame supports;
a fan section forward of said core section including a first fan blade row connected to said first drive shaft and a second fan blade row connected to said second drive shaft, said fan section supported by one of said frame supports;
a booster compressor including a first compressor blade row connected to said first drive shaft and a second compressor row connected to said second drive shaft and supported by one of said frame supports, and a non structure supporting outer annular nacelle disposed coaxially about a center line of said engine and outwardly of said casing.

9. A gas turbine engine as recited in claim 8 and further comprising a rotating exhaust system coupled to rotate with one of said turbine blade rows.

10. A gas turbine engine as recited in claim 8, and comprising a high speed bearing system for rotatably mounting said core engine to said frame supports; and a low speed differential bearing system for rotatably mounting said power turbine, said fan section and said booster compressor to said frame supports.

11. A gas turbine engine as recited in claim 8, and further comprising an annular fan duct surrounding said fan section, and radial struts for retaining said fan duct, said struts supported by one of said frame supports.

12. A high bypass ratio, counter rotating gearless front fan engine, comprising:
a gas generator effective for generating combustion gases;
a counterrotating power turbine including a first turbine rotor having a plurality of first turbine blade rows extending radially inwardly therefrom, and a second turbine rotor having a plurality of second turbine blade rows extending radially outwardly therefrom, said first and second turbine rotors being interdigitated and counterrotatable, and effective for driving first and second drive shafts, respectively;
a counterrotating fan section including a first fan blade row connected to said first drive shaft and a second fan blade row connected to said second drive shaft; and
a counterrotating booster compressor including a first compressor rotor connected to said first drive shaft having a plurality of first compressor blade rows extending radially outwardly therefrom, and a second compressor rotor connected to said second drive shaft having a plurality of second compressor blade rows extending radially inwardly therefrom and interdigitated with said first blade rows, whereby each turbine blade row of the first and second turbine blade rows respectively drives both a fan blade row and a compressor blade row;
wherein said gas generator is a separate unit from said power turbine, fan section, and booster compressor and wherein said gas generator in non-interdigitated with said fan section, booster compressor, or power turbine and wherein said booster compressor is axially positioned between said first and second fan blade rows.

13. An engine as recited in claim 12, and comprising an air intake into the engine, one of said booster compressor rotors defining a part of said air intake.

14. An engine as recited in claim 12, and further comprising a fan duct annularly surrounding said fan section, and radial struts supporting said fan duct, said struts being axially positioned forward of said gas generator.

15. An engine as recited in claim 14, wherein said first and second fan blade rows extend radially outward proximate to said fan duct.

16. An engine as recited in claim 12, and further comprising a rotating vane frame positioned aft of said booster compressor.

* * * * *

UNITED STATES PATENT AND TRADEMARK OFFICE
CERTIFICATE OF CORRECTION

PATENT NO.  :   4,860,537
DATED       :   August 29, 1989
INVENTOR(S) :   John B. Taylor It is certified that error appears in the above-identified patent and that said Letters Patent is hereby corrected as shown below:

Title page, Assignee line, delete

"Brandt, Inc., Bensalem, Pennsylvania"

AND IN ITS PLACE, INSERT:

--   General Electric Company, Cincinnati, Ohio   --

Signed and Sealed this

Twenty-fifth Day of June, 1991

Attest:

HARRY F. MANBECK, JR.

*Attesting Officer*           *Commissioner of Patents and Trademarks*